Patented June 19, 1951

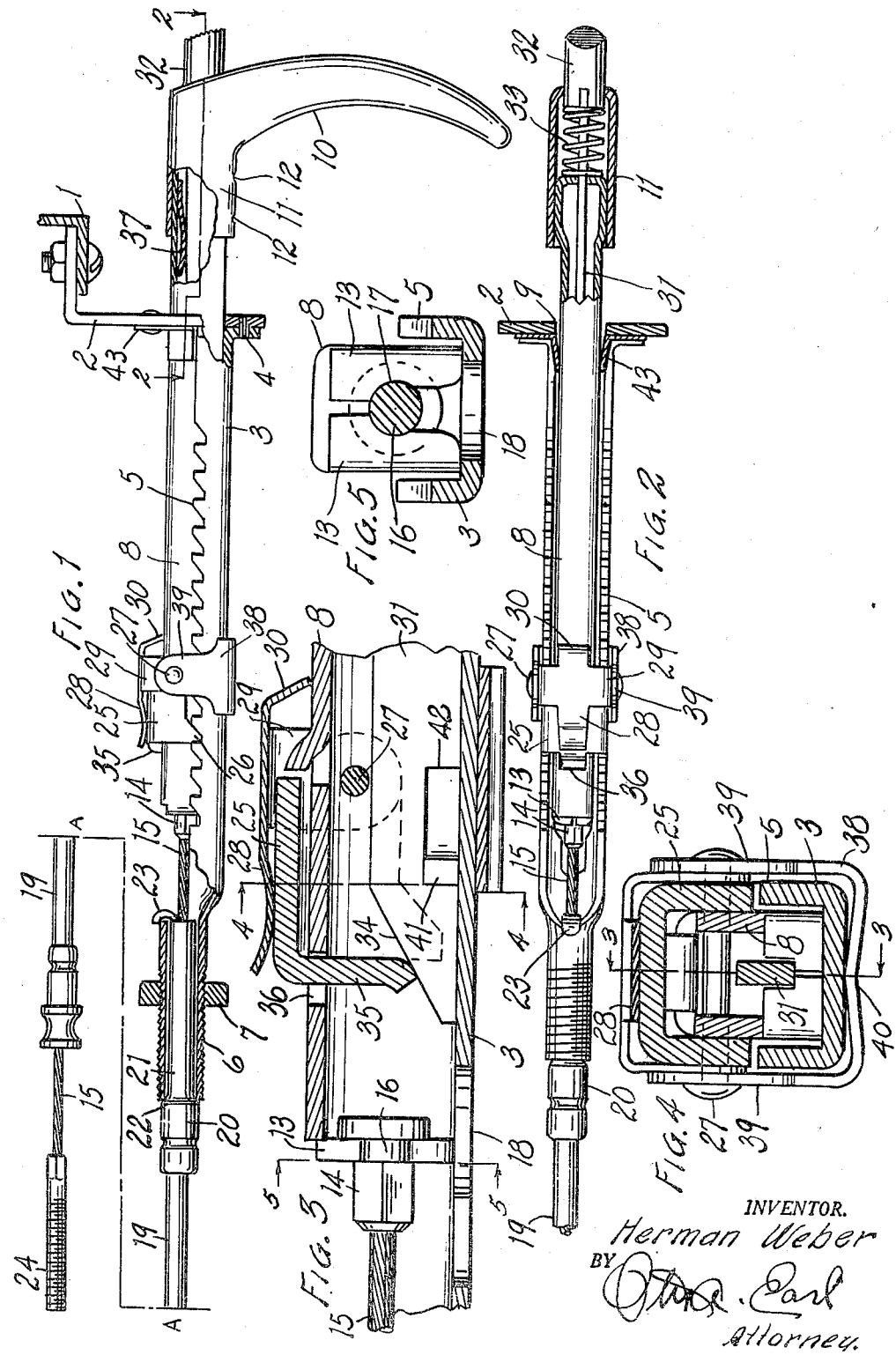

2,557,365

UNITED STATES PATENT OFFICE 2,557,365

REMOTE CONTROL DEVICE FOR BRAKES AND OTHER REMOTE CONTROLLED PARTS

Herman Weber, Kalamazoo, Mich., assignor to Shakespeare Products Company, Kalamazoo, Mich., a corporation of Michigan Application June 30, 1949, Serial No. 102,386

12 Claims. (Cl. 74—502)

This invention relates to improvements in remote control devices for brakes and other remote controlled parts.

The main objects of this invention are:

First, to provide a control device which is well adapted for use in controlling brakes and is strong and rigid, and one in which the parts are effectively supported in their coacting relation.

Second, to provide a control device in which the adjusting member is substantially smooth so that there are no parts with which the operator or the operator's clothing is likely to become engaged.

Third, to provide a structure of this type which is very easily and quickly assembled both in the assembly of the parts and complete assembly.

Fourthr, to provide a control device having these advantages which may be very economically produced.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevational view of a control device embodying my invention, parts thereof being shown in longitudinal section.

Fig. 2 is a fragmentary plan view with certain parts in longitudinal section on a line corresponding to line 2—2 of Fig. 1.

Fig. 3 is an enlarged fragmentary view partially in longitudinal section on a line corresponding to line 3—3 of Fig. 4 with certain parts in full lines.

Fig. 4 is a transverse section on a line 4—4 of Fig. 3.

Fig. 5 is a transverse section on a line 5—5 of Fig. 3.

In the accompanying drawing, I represents a part of a motor vehicle or other support on which the bracket 2 is mounted. The supporting member 3 is of channel section and secured at its forward end to the bracket 2 preferably by welding as indicated at 4. The support member 3 is provided with forwardly facing ratchet teeth 5 on its flanges and terminates in an integral tubular portion 6 at its rear end externally threaded to receive one or more nuts 7 for facilitating mounting on a support not illustrated.

The adjusting member 8 is of channel section and disposed to face the support member and is slidable therein and through the opening 9 in the bracket 2. At its forward end the adjusting member is provided with a grip 10 having a socket 11 receiving the end of the adjusting member and secured thereto as by staking indicated at 12. At its rear end the adjusting member is provided with inwardly turned lugs 13 adapted to receive between them the coupling head 14 of the flexible transmission member 15.

The head 14 is provided with a groove 16 with which the lugs 13 engage, the lugs being conformed at 17 to receive the reduced portion of the head and retain it in assembled relation. To facilitate assembling of the parts, the web of the support member is provided with a suitably shaped slot 18 through which the head may be passed and then swung upwardly and engaged between the lugs, the adjusting member having been previously positioned in the support member to permit this engagement.

The transmission member 15 is provided with a sheath 19 having a tubular adapter 20 at its front end. This adapted has a portion 21 adapted to be inserted in the tubular portion 6 of the support member as shown in Fig. 1 and with the shoulder portion 22 abutting the rear end of the tubular part 6. The adapter has a bendable lug 23 at its front end which is bent into retaining engagement with the support as is shown in Figs. 1 and 2. This arrangement enables the very rapid assembling of the transmission elements with the supporting and operating parts. The transmission member 15 is provided with a terminal 24 for facilitating its attachment to the operated part.

The detent 25 is of U-section and is provided with teeth 26 adapted to coact with the ratchet teeth 5 of the support member. The detent is pivotally mounted on the adjusting member by means of the pivot 27 arranged through the arms of the detent and through the flanges of the adjusting member, see Fig. 4. The detent is biased by the blade spring 28 which has ears 29 engaging the pivot 27 and is provided with an inturned tail portion 30 engaging the adjusting member. The detent is released by means of the reciprocating control rod 31 which is provided with a finger piece 32 projecting from the grip. The coil spring 33 acts to return the control rod. At its inner end the control rod is provided with a cam 34 coacting with the finger 35 of the detent which projects through a hole 36 in the adjusting member. The spring 37 is arranged within the adjusting member to bear on the control rod to prevent rattling thereof and also adding some frictional resistance.

To further prevent rattling and provide frictional resistance to adjustment, the U-shaped or stirrup-like friction member 38 is provided, the arms 39 of which are engaged by the pivot 27. The bight 40 of this member is upset into frictional engagement with the web of the support member 3. This upsetting operation can be performed after the parts are assembled to secure the desired frictional engagement and to prevent rattling. The stop 41 engaging the slot 42 in the control rod 31 limits the movement of the control rod. The springs 43 on the bracket engage the sides of the adjusting member to still further prevent rattling.

With the parts thus formed and arranged they may be very rapidly assembled and the structure is very strong and rigid and there are no exposed parts which might injure the operator. The ease of assembly is a very decided advantage. In the final assembly the adapter of the cable or transmission member sheath is inserted into the tubular portion of the support member and secured by the lug 23. The cable or transmission member head is dropped through the clearance slot while the detent is engaged with suitable teeth—in this embodiment the third from the rear end. In this position the head can be inserted between the lugs on the adjusting member and the lugs closed or staked upon the head member. This enables the the assembling of the parts without the necessity of handling all of them as they are put together.

The assembly of the transmission elements can be readily performed after the other parts are assembled and this avoids the necessity of handling long and unwieldy parts. Another feature of importance is that there are no rotating parts. While the applicant's control is easily manipulated by an adult, it is unlikely that a child would or could actuate the release push button finger piece which is normally under considerable pressure.

I have illustrated and described my invention in a highly practical embodiment thereof. I have not attempted to illustrate various adaptations which I contemplate as it is believed this disclosure will enable those skilled in the art to embody or adapt my invention as may be desired.

Having thus described my invention, what I claim as new and desire to secure by Letters Patent is:

1. In a control device, the combination of an elongated support member of channel section having forwardly facing ratchet teeth on its flanges and a mounting bracket at its front end and terminating at its rear end in an integral tubular portion, an adjusting member of channel section facing and slidable within said support member and through said bracket and having a grip at its front end and inturned lugs at its rear end, a U-shaped friction member embracing said support member with its arms projecting beyond the sides thereof and its bight in sliding frictional engagement with the support member, a detent coacting with the teeth of said support member pivotally mounted on said support member between the arms of said friction member and having a finger portion projecting into said adjusting member, a spring for said detent having downwardly projecting arms engaged by the detent pivot and having a thrust portion engaging said adjusting member, a control rod slidably supported within said support member and having a finger piece projecting from said grip and a cam coacting with said finger portion of said detent, a flexible transmission member provided with a sheath having a tubular adapter at its front end telescoped within said tubular portion of said support member and having a bendable lug on its rear end retainingly engaging said support member, said transmission member being provided with a grooved coupling head at its front end engaged between said inturned lugs on the inner end of said adjusting member, said support member having a slot in the web thereof through which the coupling head may be disposed to facilitate the engagement of the coupling with said inturned lugs.

2. In a control device, the combination of an elongated support member of channel section having forwardly facing ratchet teeth on its flanges and a mounting bracket at its front end, an adjusting member of channel section facing and slidable within said support member and through said bracket and having a grip at its front end and inturned lugs at its rear end, a U-shaped friction member embracing said support member with its arms projecting beyond the sides thereof and its bight in sliding frictional engagement with the support member, a detent coacting with the teeth of said support member pivotally mounted on said support member between the arms of said friction member and having a finger portion projecting into said adjusting member, a spring for said detent having downwardly projecting arms engaged by the detent pivot and having a thrust portion engaging said adjusting member, a control rod slidably supported within said support member and having a finger piece projecting from said grip and a cam coacting with said finger portion of said detent, a flexible transmission member provided with a grooved coupling head at its front end engaged between said inturned lugs on the rear end of said adjusting member, said support member having a slot in the web thereof through which the coupling head may be disposed to facilitate the engagement of the coupling with said inturned lugs.

3. In a control device, the combination of an elongated support member of channel section having forwardly facing ratchet teeth on its flanges and a mounting bracket at its front end, an adjusting member of channel section facing and slidable within said support member and through said bracket and having a grip at its front end, a U-shaped friction member embracing said support member with its arms projecting beyond the sides thereof and its bight in sliding frictional engagement with the support member, a detent coacting with the teeth of said support member pivotally mounted on said support member between the arms of said friction member and having a finger portion projecting into said adjusting member, a spring for said detent having downwardly projecting arms engaged by the detent pivot and having a thrust portion engaging said adjusting member, a control rod slidably supported within said support member and having a finger piece projecting from said grip and a cam coacting with said finger portion of said detent.

4. In a control device, the combination of an elongated support member of channel section having forwardly facing ratchet teeth on its flanges and a mounting bracket at its front end, an adjusting member of channel section facing and slidable within said support member and through said bracket and having a grip at its front end, a U-shaped friction member embracing said support member with its arms projecting beyond the sides thereof and its bight in sliding frictional engagement with the support member, a detent coacting with the teeth of said support member pivotally mounted on said support member between the arms of said friction member and having a finger portion projecting into said adjusting member, a spring for said detent having downwardly projecting arms engaged by the detent pivot and having a thrust portion engaging said adjusting member, a control rod slidably supported within said support member and having a finger piece projecting from said grip and a cam coacting with said finger portion of said detent, a spring arranged within said adjusting member to frictionally engage said control rod, and a transmission member connected to said adjusting member.

5. In a control device, the combination of an elongated support member of channel section having forwardly facing ratchet teeth on its flanges and a mounting bracket at its front end, an adjusting member of channel section facing and slidable within said support member and through said bracket and having a grip at its front end, a U-shaped friction member embracing said support member with its arms projecting beyond the sides thereof and its bight in sliding frictional engagement with the support member, a detent coacting with the teeth of said support member pivotally mounted on said adjusting member between the arms of said friction member and having a finger portion projecting into said adjusting member, a spring for said detent having downwardly projecting arms engaged by the detent pivot and having a thrust portion engaging said adjusting member, and a control rod slidably supported within said support member and having a finger piece projecting from said grip and a cam coacting with said finger portion of said detent.

6. In a control device, the combination of an elongated support member of channel section having forwardly facing ratchet teeth on its flanges and a mounting bracket at its front end, an adjusting member of channel section facing and slidable within said support member and through said bracket and having a grip at its front end, a U-shaped friction member embracing said support member with its arms projecting beyond the sides thereof and its bight in sliding frictional engagement with the support member, a detent coacting with the teeth of said support member pivotally mounted on said adjusting member between the arms of said friction member and having a finger portion projecting into said adjusting member, a spring for said detent, and a control rod slidably supported within said support member and having a finger piece projecting from said grip and a cam coacting with said finger portion of said detent.

7. In a control device, the combination of an elongated support member of channel section having ratchet teeth on its flanges and terminating at its rear end in an integral tubular portion, and adjusting member of channel section facing and slidable within said support member and having a grip at its front end and inturned lugs at its rear end, a spring biased detent pivotally mounted on said adjusting member to coact with the teeth of said support member, a control rod slidably supported within said support member and having a finger piece projecting from said grip and a cam coacting with said detent, said detent and its spring acting to return said control rod to its initial position, a spring arranged within said adjusting member to frictionally engage said control rod, a flexible transmission member provided with a sheath having a tubular adapter at its front end telescoped within said tubular portion of said support member and having a bendable lug on its front end retainingly engaging said support member, said transmission member being provided with a grooved coupling head at its front end engaged between said inturned lugs on the rear end of said adjusting member, said support member having a slot in the web thereof through which the coupling head may be disposed to facilitate the engagement of the coupling with said inturned lugs.

8. In a control device, the combination of an elongated support member of channel section having ratchet teeth on its flanges and terminating at its rear end in an integral tubular portion, an adjusting member of channel section facing and slidable within said support member and having a grip at its front end and inturned lugs at its rear end, a spring biased detent pivotally mounted on said adjusting member to coact with the teeth of said support member, a control rod slidably supported within said support member and having a finger piece projecting from said grip and a cam coacting with said detent, a flexible transmission member provided with a sheath having a tubular adapter at its front end telescoped within said tubular portion of said support member and having a bendable lug on its front end retainingly engaging said support member, said transmission member being provided with a grooved coupling head at its front end engaged between said inturned lugs on the rear end of said adjusting member, said support member having a slot in the web thereof through which the coupling head may be disposed to facilitate the engagement of the coupling with said inturned lugs.

9. In a control device, the combination of an elongated support member of channel section having ratchet teeth on its flanges and terminating at its rear end in an integral tubular portion, an adjusting member of channel section facing and slidable within said support member, a spring biased detent pivotally mounted on said adjusting member to coact with the teeth of said support member, a control rod slidably supported within siad support member to coact with said detent and having a finger piece projecting from said adjusting member, and a flexible transmission member connected to said adjusting member and provided with a sheath having a tubular adapter at its front end telescoped within said tubular portion of said support member and having a bendable lug on its front end retainingly engaging said support member.

10. In a control device, the combination of an elongated support member of channel section having ratchet teeth on its flanges, an adjusting member of channel section facing and slidable within said support member and having inturned lugs at its rear end, a spring biased detent pivotally mounted on said adjusting member to coact with the teeth of said support member, a control rod for said detent slidably supported within said support member, and a flexible transmission member provided with a coupling head at its front end engaged between said inturned lugs on the rear end of said adjusting member.

11. In a control device, the combination of a support member of channel section having ratchet teeth on its flanges, an adjusting member of channel section facing and slidable within said support member and having inturned lugs at its rear end, a spring biased detent of U-section embracing and pivotally mounted on said adjusting member to coact with the teeth of said support member, a control rod slidable within said support member and having a finger piece at the front end thereof, said detent having a finger projecting inwardly through an opening in said adjusting member, said control rod having a cam portion coacting with said detent finger, a stop limiting the return movement of said control rod, and a transmission element connected to said adjusting member.

12. In a control device, the combination of a support member of channel section having ratchet teeth on its flanges, an adjusting member of channel section facing and slidable within said support member and having inturned lugs at its rear end, a spring biased detent mounted on said adjusting member to coact with the teeth of said support member, a control rod for said detent slidable within said support member and having a finger piece at the front end thereof, and a transmission element connected to said adjusting member.

HERMAN WEBER.

REFERENCES CITED

The following references are of record in the file of this patent:

UNITED STATES PATENTS

| Number | Name | Date |
|---|---|---|
| 1,564,725 | Topham | Dec. 8, 1925 |
| 1,821,576 | Potter | Sept. 1, 1931 |
| 2,136,095 | Baumheckel | Nov. 8, 1938 |
| 2,177,456 | Irving | Oct. 24, 1939 |
| 2,304,266 | McCarthy | Dec. 8, 1942 |

FOREIGN PATENTS

| Number | Country | Date |
|---|---|---|
| 516,309 | Great Britain | Dec. 29, 1939 |
| 581,837 | France | Dec. 6, 1924 |